March 13, 1951 A. S. THOMPSON 2,544,812
JEWELER'S LATHE
Filed Nov. 13, 1947 3 Sheets-Sheet 1
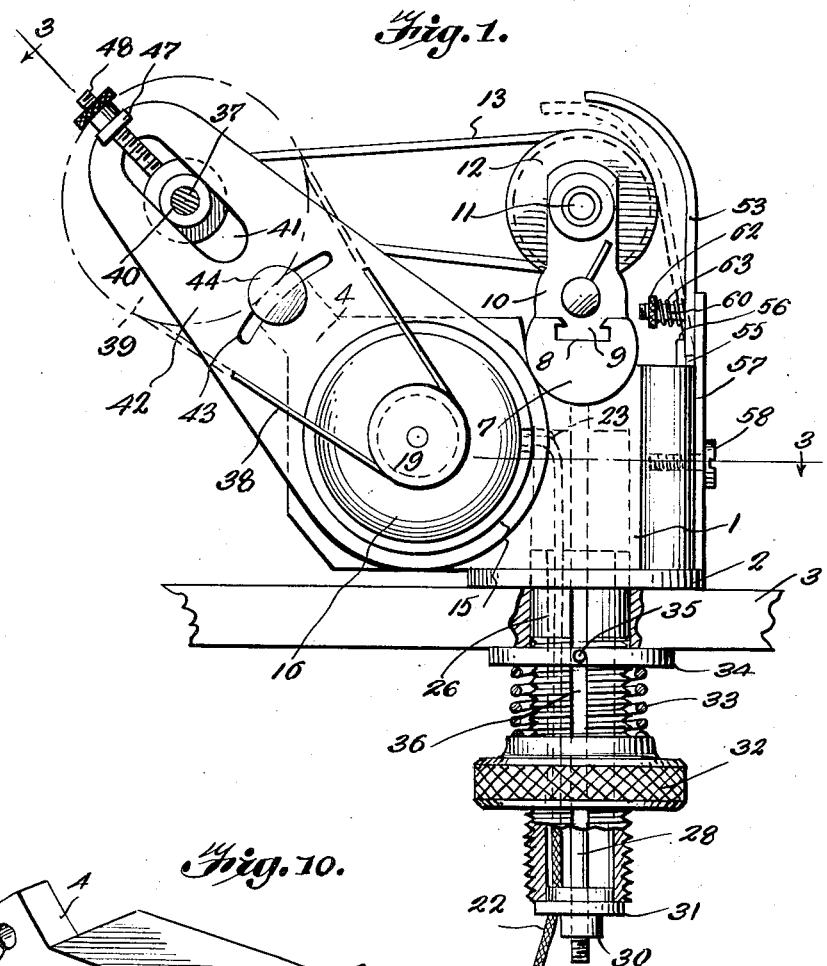
INVENTOR.
ARTHUR S. THOMPSON
BY
Russ J. Woodward
ATTORNEY March 13, 1951    A. S. THOMPSON    2,544,812
JEWELER'S LATHE
Filed Nov. 13, 1947    3 Sheets-Sheet 2
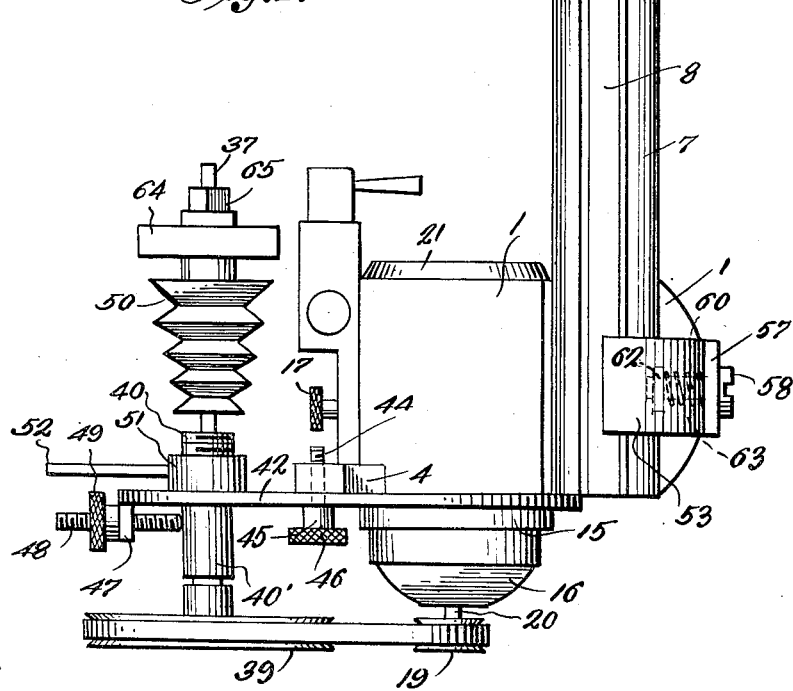
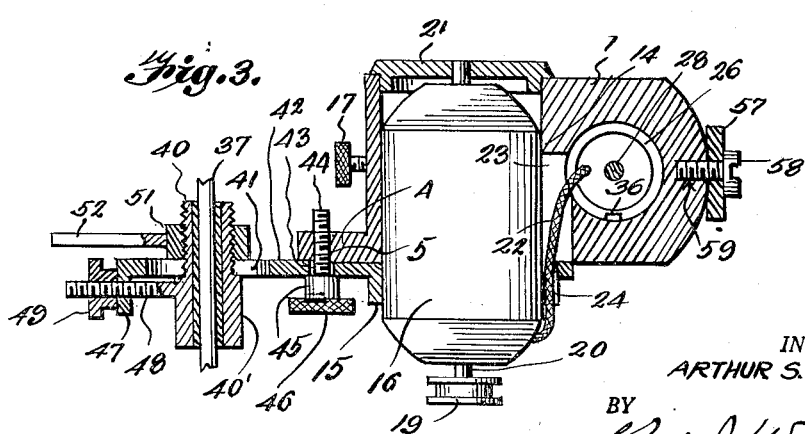
INVENTOR.
ARTHUR S. THOMPSON March 13, 1951　　　A. S. THOMPSON　　　2,544,812
JEWELER'S LATHE
Filed Nov. 13, 1947　　　3 Sheets-Sheet 3
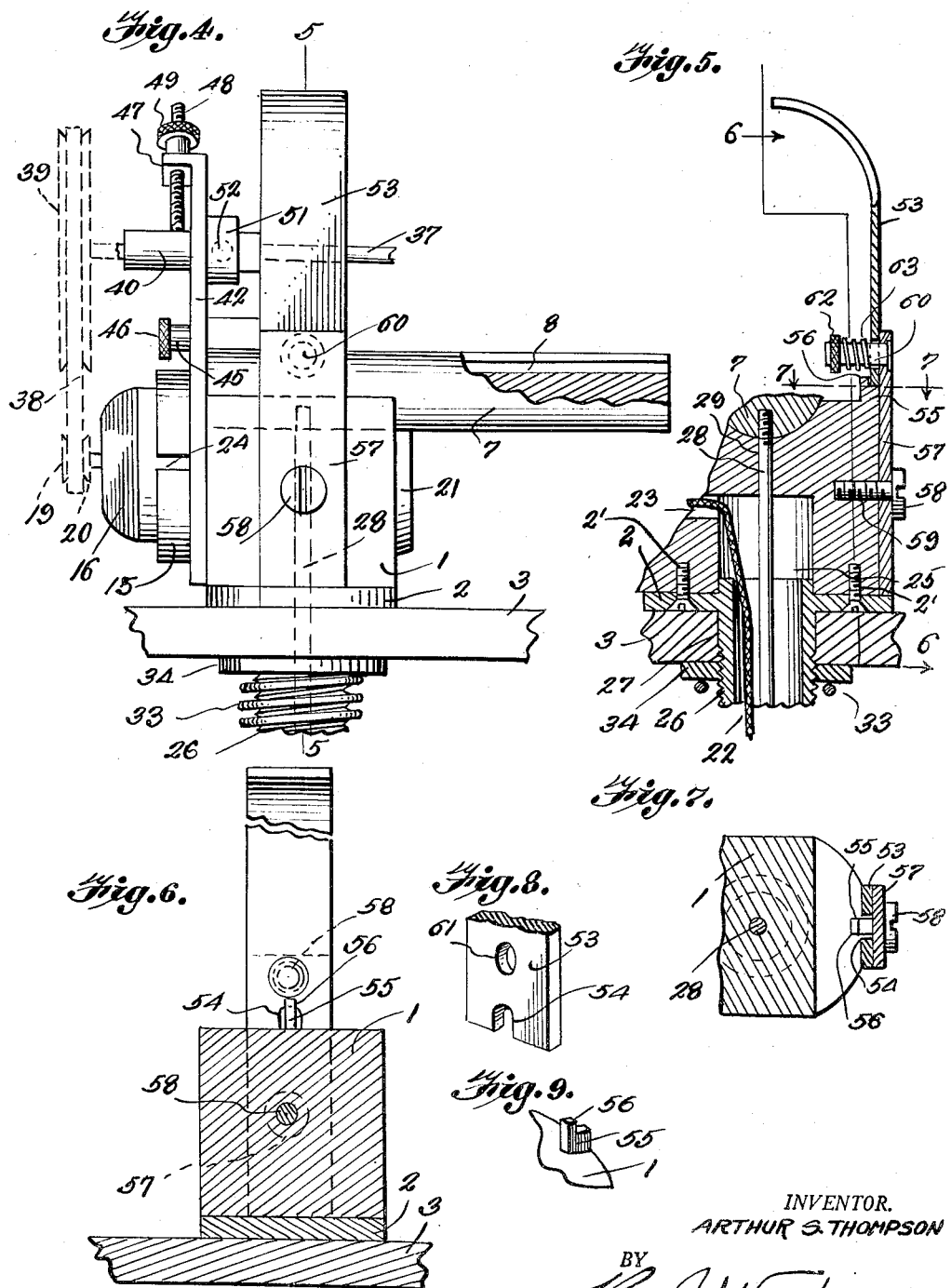
INVENTOR.
ARTHUR S. THOMPSON
BY
ATTORNEY Patented Mar. 13, 1951

2,544,812

UNITED STATES PATENT OFFICE 2,544,812

JEWELER'S LATHE

Arthur S. Thompson, Ontario, Calif.

Application November 13, 1947, Serial No. 785,783

5 Claims. (Cl. 82—6)

This invention relates to a mounting for a jeweler's lathe and motor and it is one object of the invention to provide a mounting of such construction that it carries a lathe bed and motor and in addition carries an arm through which a countershaft is rotatably mounted, the arm being adjustable angularly and the bearing for the countershaft being shiftable longitudinally of the arm so that belts for transmitting rotary motion from the motor to the countershaft and from the countershaft to the spindle of a latch may be tightened and held under proper tension.

Another object of the invention is to provide a mounting, wherein, the base block may be turned to any position and held at the desired position by means of a friction stem attached to lathe base or block, and thus bring a grind stone or polishing wheel into position where it can be conveniently used.

Another object of the invention is to provide a lathe base so constructed that it can be quickly attached to any standard jeweler's lathe bed or bar.

Another object of the invention is to provide a mounting wherein the base block is provided with a depending friction stem for holding the block in an adjusted position, there being a rod or elongated bolt passing through the friction stem and serving to firmly hold a lathe bed in place within a recess or saddle formed in the upper face of the block.

Another object of the invention is to provide a mounting block which carries a shield or guard strip serving as a protector to prevent a broken belt from damaging the eye of a jeweler using the lathe, the guard being so mounted that it may be swung into engagement with the pulley carried by the spindle of the lathe and thus act as a friction brake to stop rotation of the spindle when work is to be removed from the lathe.

Another object of the invention is to provide a mounting of this character which is of simple construction, easy to install in position for use and very efficient in operation.

The invention is illustrated in the accompanying drawings wherein:

Fig. 1 is an end view of the mounting showing a lathe and motor carried thereby.

Fig. 2 is a top plan view of the mounting and the lathe and the motor shown in Figure 1.

Figure 3 is a sectional view taken along the line 3—3 of Figure 1.

Fig. 4 is a view in front elevation looking from the right of Figures 1 and 2.

Fig. 5 is a vertical sectional view taken along the line 5—5 of Figure 4.

Fig. 6 is a vertical sectional view taken along the line 6—6 of Figure 5.

Fig. 7 is a fragmentary sectional view taken along the line 7—7 of Figure 5.

Fig. 8 is a perspective view of the lower end of the eye guard.

Fig. 9 is a fragmentary view of the upper end of the front portion of the base block.

Fig. 10 is a perspective view of the base block.

This improved mounting for a jeweler's lathe and motor has a base block 1 formed of strong metal and having a flat under face so that it will rest flat upon a plate or disk 2, which is secured to the block by a suitable number of screws 2' and rests upon the upper surface of a work bench 3. It will be understood that the washer may be formed integral with the block and constitute a depending flange or foot for the front end of the block if so desired. An ear or lug 4 formed with a transversely extending opening 5, extends upwardly from the rear end of the block at a rearward incline and near its front end the upper face of the block is formed with a recess 6, which has transversely arcuate walls and serves as a seat or saddle for a bar 7 constituting a lathe bed and formed along its upper face with the usual undercut groove 8 to receive the foot 9 of a movable lathe head 10. The lathe head carries the usual spindle 11 upon which is mounted a pulley 12 so that rotary motion may be imparted to the spindle by a belt 13.

Between the seat or cradle 6 and the rear end of the base block is formed a passage 14 surrounded at one end by an outstanding flange 15 and through this passage is mounted a motor 16 which is firmly, but removably, held in place by a set screw 17, which passes through a threaded opening 18 formed through the rear end portion of the block and having its end frictionally gripping the motor when it is tightened. The rear portion of the motor projects outwardly from the block and carries a small pulley wheel 19 upon its shaft 20 and the front end of the passage is closed by a cap or cover 21 which is snapped into place so that it may be easily removed when necessary. Current is supplied to the motor by a wire 22 which passes through a slot 23 formed in the base block and also through a notch 24 formed through the flange 15 and constituting an extension of the slot. The wire passes downwardly through a pocket 25 in the base block and also through a tubular post or stem 26, which is rigid with the disk 2 and passes through an opening 27 formed through the bench 3 and will be of any length necessary to reach a power outlet.

A rod 28 carried by the bed 7 passes downwardly through an opening 29 in the block and through the pocket 25 and the post 26 and at its lower end carries a nut 30 which is tightened and forces a washer 31 against the lower end of the post so that the bed 7 will be firmly held in the saddle of the block. The threaded post carries a hand nut 32 which engages the lower end of a helical spring 33, coiled about the stem and having its upper end engaged with a washer 34 which is slidable along the post and bears against the under surface of the bench and when the nut 32 is tightened to compress the spring, the washer 34 will be forced against the bench and have frictional binding engagement therewith to prevent unintentional turning of the stem and the block. A pin 35 which passes through the washer engages in a groove or keyway 36 formed longitudinally of the post and prevents the washer and the post from having turning movement relative to each other. Due to this formation and arrangement of parts the block may be easily turned with the stem, but after it has been turned to an adjusted position it will be frictionally held stationary.

Rotary motion is transmitted from the motor to a countershaft 37 by a belt 38 trained about the pulley 19 of the motor, and about a larger pulley wheel 39 carried by the countershaft. The countershaft is rotatably mounted through a bearing sleeve 40 which passes through a slot 41, formed longitudinally of an arm 42, which has one end portion formed with a circular opening to snugly receive the annular flange 15 and mount the arm for tilting movement about the flange. An arcuate slot 43 is formed through the arm transversely thereof, and through this slot passes a screw 44 having an enlarged portion 45 carrying a head 46 by means of which the screw is hand turned. The screw engages in the threaded opening 5 formed through the lug 4, and when the screw is tightened its enlarged portion 45 forces the arm 42 into gripping engagement with the confronting side face of the lug and the arm will be firmly held in a set position. An ear 47 projects laterally from the upper end of the arm 42 and through an opening formed in the ear, slidably passes a threaded stem 48 carried by the bearing sleeve 40. This stem carries a nut 49 which rests against the ear 47 and when the nut is turned the bearing sleeve will be shifted along the arm 42, and the belt 38 tightened so that it has proper frictional engagement with the pulleys 19 and 39, to cause turning of the countershaft. A multiple speed-change pulley 50 is carried by the countershaft 37 and about this pulley engages the belt 13 by means of which rotary motion is transmitted to the spindle 11 of the lathe head 10. By shifting the belt along the pulley 50, the speed at which the spindle rotates may be controlled. The belt 13 must be held at proper tension to turn the spindle and this is accomplished by tilting the arm 42 about flange 15 until the belt is at proper tightness. A nut 51 carried by the threaded end portion of the bearing sleeve 40 is then grasped by its turning handle or lever 52 and turned to bring the enlarged portion 40' of the bearing into gripping engagement with the confronting side face of the arm 42 and the bearing will be held in the adjusted position and the belt 13 held at the desired tightness.

During the use of the lathe the jeweler has to assume a position in which his eye is close to the work and if the belt 13 should snap it is liable to strike him in his face and injure his eye. In order to prevent this there has been provided a guard or shield 53 formed from a sheet of metal and having its upper portion curved longitudinally. This guard or shield is disposed vertically and at its lower end is formed with a notch 54 to receive a lug or tooth 55, carried by and projecting upwardly from the front end of the base block 1, the lug or tooth carrying an upstanding finger 56 which overlaps the rear or inner face of the guard and prevents it from slipping rearwardly off of the lug. A plate 57 is mounted against the front end of the base block by a screw 58, engaged in a threaded socket 59, formed in the base block and the upper end portion of this plate projects upwardly from the block in overlapping relation to the lower end of the shield, as shown in Figure 5. This protruding upper end of the mounting plate carries a stem 60, which projects rearwardly therefrom and passes through an opening 61, formed through the shield a short distance above the notch 54 and the threaded rear end portion of this stem or bolt 60 carries a nut 62 by means of which a spring 63 is compressed and held under tension so that the shield will be normally held in its upright position. The shield is yieldable rearwardly and when it is desired to stop rotation of the spindle, the jeweler grasps the shield and tilts it rearwardly, as indicated by dotted lines in Figure 1, and as the shield is tilted its curved upper portion will be moved into engagement with the periphery of the pulley 12 and serve as a brake to frictionally stop rotation of the pulley and the spindle. When the jeweler desires to grind a tool or an article being worked upon, the base block is grasped and turned with the stem until the countershaft and the grind stone 64 carried thereby are presented forwardly. The grind stone is held upon the countershaft by a nut 65, so that it may be removed when replacement is necessary or it is desired to substitute a polishing wheel in place of the grind stone.

Having thus described the invention, what is claimed is:

1. In a lathe and motor mounting, a base block formed with a lathe receiving saddle and with an opening for receiving a motor, a passage being formed through the block for a power wire of a motor, a tubular post extending downwardly from the block for passing through a work bench and constituting a continuation of the wire passage, said post serving to mount the block for turning movement to adjusted positions, a washer about said post held against rotation thereon, a spring about the post having its upper end engaging the washer, and an abutment nut threaded upon said post and engaging the lower end of the spring to compress and tension the spring for urging the washer upwardly into gripping engagement with the under face of a work bench and frictionally holding the base block in a set position after being turned to an adjusted position.

2. In a lathe and motor mounting, a base block formed with a saddle, a lathe bed resting in said saddle and having a stem extending downwardly through the block and of a length adapting it to pass through a work bench, a tubular post extending downwardly under the block and surrounding said stem, a fastener carried by the stem and engaging the lower end of said post and tightened to firmly hold the post and the lathe bed in place upon a work bench, a washer fitting about said post for engaging the under face of the work bench, a spring about said post having its upper end engaging said washer, and a nut threaded upon said post and engaging the lower end of the spring for tensioning the spring and urging the washer upwardly into gripping engagement with the work bench and frictionally holding the base block in a set position when turned about the post to adjusted positions.

3. In a lathe and motor mounting, a base block, a lathe bed carried thereby, a tubular post extending downwardly from said block for passing through a work bench and mounting the block for turning movement to adusted positions, a stem extending downwardly from said lathe and through said post, a fastener carried by said stem and engaging the lower end of said post, and means carried by the post for engaging the work bench and frictionally holding the block in an adjusted position.

4. In a lathe and motor mounting, a base block formed with a transversely extending motor-receiving opening, a flange about the outer end of said opening, a motor mounted in said opening with an end portion projecting outwardly beyond the flange and equipped with a pulley, a removable cap closing the inner end of the opening, a lathe bed carried by said base block, a bar having an inner end portion fitting about the flange and mounting the bar for swinging movement to adjusted positions, a bearing carried by said bar and shiftable longitudinally thereof to adjusted positions, a counter shaft passing through the bearing and projecting from outer and inner ends thereof, a pulley upon the outer end of said counter shaft, a belt trained about the pulleys of the motor and the counter shaft, and means for releasably securing the counter shaft in an adjusted position upon said bar and retaining the belt at predetermined tension.

5. In a lathe and motor mounting, a base block, a lathe bed carried by the block, a motor carried by said block and equipped with a pulley, an arm projecting rearwardly from said block and formed with a threaded opening, a bar mounted upon the block for vertical swinging movement to adjusted positions and formed with a transverse slot, a clamping screw passing through the slot and engaged in the opening of the arm and tightened to releasably secure the arm in a set position, a bearing slidable along the bar to adjusted positions, means for releasably securing the bearing in adjusted positions, a countershaft rotatably mounted through said bearing, a pulley carried by said countershaft, and a belt trained about the pulleys of the motor and the countershaft and tightened by movement of the bearing towards the outer end of the bar.

ARTHUR S. THOMPSON.

REFERENCES CITED

The following references are of record in the file of this patent:

UNITED STATES PATENTS

| Number | Name | Date |
|---|---|---|
| 1,105,529 | Newton | July 28, 1914 |
| 1,322,543 | Clark | Nov. 25, 1919 |
| 1,417,521 | Haumann | May 30, 1922 |
| 2,043,947 | Blanchard | June 9, 1936 |
| 2,090,818 | Stanley | Aug. 24, 1937 |
| 2,249,146 | Krug | July 15, 1941 |